US012592437B2

(12) United States Patent
Maeda et al.

(10) Patent No.: US 12,592,437 B2
(45) Date of Patent: Mar. 31, 2026

(54) SQUARE TYPE BATTERY AND MANUFACTURING METHOD OF SQUARE TYPE BATTERY

(71) Applicant: Prime Planet Energy & Solutions, Inc., Tokyo (JP)

(72) Inventors: Hitoshi Maeda, Himeji (JP); Mitsuhiro Okada, Himeji (JP); Hiroshi Takabayashi, Koriyama (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 596 days.

(21) Appl. No.: 17/965,763

(22) Filed: Oct. 14, 2022

(65) Prior Publication Data

US 2023/0117525 A1 Apr. 20, 2023

(30) Foreign Application Priority Data

Oct. 18, 2021 (JP) ................................. 2021-170291

(51) Int. Cl.
*H01M 50/15* (2021.01)
*H01M 50/296* (2021.01)

(52) U.S. Cl.
CPC ......... *H01M 50/15* (2021.01); *H01M 50/296* (2021.01)

(58) Field of Classification Search
CPC ............................ H01M 50/15; H01M 50/296
See application file for complete search history.

(56) References Cited

U.S. PATENT DOCUMENTS

2023/0055059 A1 2/2023 Sasaki

FOREIGN PATENT DOCUMENTS

| JP | H11-031523 A | 2/1999 |
| JP | 2004228035 A | 8/2004 |
| JP | 2013-118152 A | 6/2013 |
| JP | 2014086291 A | 5/2014 |
| JP | 2014139883 A | 7/2014 |
| JP | 2018-085180 A | 5/2018 |
| WO | 2021/193184 A1 | 9/2021 |

OTHER PUBLICATIONS

Translation JP2015207494 (Year: 2015).*
JPH10208777 translation (Year: 2005).*

* cited by examiner

*Primary Examiner* — Jane J Rhee
(74) *Attorney, Agent, or Firm* — HAUPTMAN HAM, LLP

(57) ABSTRACT

A square type battery includes a cover that is provided with a terminal and is formed in a substantially rectangle, a case main body that is formed in a substantially rectangular parallelopiped and that includes two pairs of opposed side surfaces connected to a peripheral edge part of the cover, and an electrode body that is accommodated inside the case main body and that is connected to the terminal. At least a first side surface among the two pairs of opposed side surfaces is pinched toward an inward of the case main body. The first side surface and a second side surface opposed to the first side surface abut the electrode body.

8 Claims, 4 Drawing Sheets

SQUARE TYPE BATTERY AND MANUFACTURING METHOD OF SQUARE TYPE BATTERY

CROSS-REFERENCE TO RELATED APPLICATIONS

The present application claims the priority based on Japanese Patent Application No. 2021-170291 filed on Oct. 18, 2021, the entire contents of which are incorporated in the present specification by reference.

BACKGROUND

The present disclosure relates to a square type battery and a manufacturing method of the square type battery.

BACKGROUND ART

For example, Japanese Patent Application Publication No. 2004-228035 discloses a manufacturing method of a cylinder type battery that includes a diameter reducing step for squeezing a side wall of an outer can in which a spiral electrode body is accommodated, in which squeezing is performed toward an inside in a diameter direction. At the diameter reducing step disclosed in Japanese Patent Application Publication No. 2004-228035, the outer can is passed through a tapered through hole so as to perform a squeezing process on all areas from a bottom portion of the side wall to an opening edge of the outer can. Japanese Patent Application Publication No. 2004-228035 describes that this method can manufacture a battery whose battery capacity with respect to a battery volume is high. Japanese Patent Application Publication No. 2004-228035 describes that a square shaped lithium ion battery or the like also could be a target.

SUMMARY

Regarding a square type battery in which an electrode body is accommodated in a case main body formed in a substantially rectangular parallelopiped, it is also required to suppress the electrode body from moving in the case main body.

A square type battery disclosed here comprises a cover that is formed in a substantially rectangle and provided with a terminal, a case main body that is formed in a substantially rectangular parallelopiped and that includes two pairs of opposed side surfaces connected to a peripheral edge part of the cover, and an electrode body that is accommodated inside the case main body and connected to the terminal. At least a first side surface among the two pairs of opposed side surfaces is pinched toward an inward of the case main body. The first side surface and a second side surface opposed to the first side surface abut the electrode body.

According to the above-described square type battery, at least one pair of side surfaces (the first and the second side surface) in the case main body abut the electrode body so as to hold the electrode body. Thus, it is possible to suppress the electrode body from moving in the case main body.

A manufacturing method of a square type battery disclosed here comprises accommodating an electrode body inside a case main body formed in a substantially rectangular parallelopiped, and pressing at least one side surface of a case main body and deforming the pressed side surface to make the pressed side surface and a side surface opposed to the pressed side surface abut the electrode body. According to the above-described manufacturing method of the square type battery, it is possible to manufacture the square type battery that can suppress the electrode body from moving in the case main body.

In the above-described square type battery, the two pairs of opposed side surfaces might include one pair of broad width side surfaces and one pair of narrow width side surfaces. The first side surface is one among the one pair of narrow width side surfaces. The second side surface is another among the one pair of narrow width side surfaces. And at least one among the one pair of broad width side surfaces might be separated and spaced away from the electrode body. In the manufacturing method of the square type battery described above, side surfaces of the case main body might include a side surface to which a cover provided with a terminal is attached, and one pair of broad width side surfaces and one pair of narrow width side surfaces each connected to the side surface to which the cover is attached. And at the deforming the side surface, at least one among the one pair of narrow width side surfaces might be deformed.

In the above-described square type battery, the first side surface might include an abutting part that abuts the electrode body, and a separation parts that are positioned at both sides of the abutting part and separated and spaced away from the electrode body. In the above-described manufacturing method of the square type battery, at the deforming the side surface, the pressed side surface might be pressed partially.

DETAILED DESCRIPTION

Below, one embodiment of a square type battery will be explained. Incidentally, the embodiment explained here is, of course, not intended to particularly restrict the present invention. Each figure is a schematic view, and does not always truly reflect the actual implemented product. Below, the members/parts providing the same effect are provided with the same numerals and signs, and overlapped explanations are suitably omitted or simplified.

[Configuration of Square Type Battery]

Figure 1:
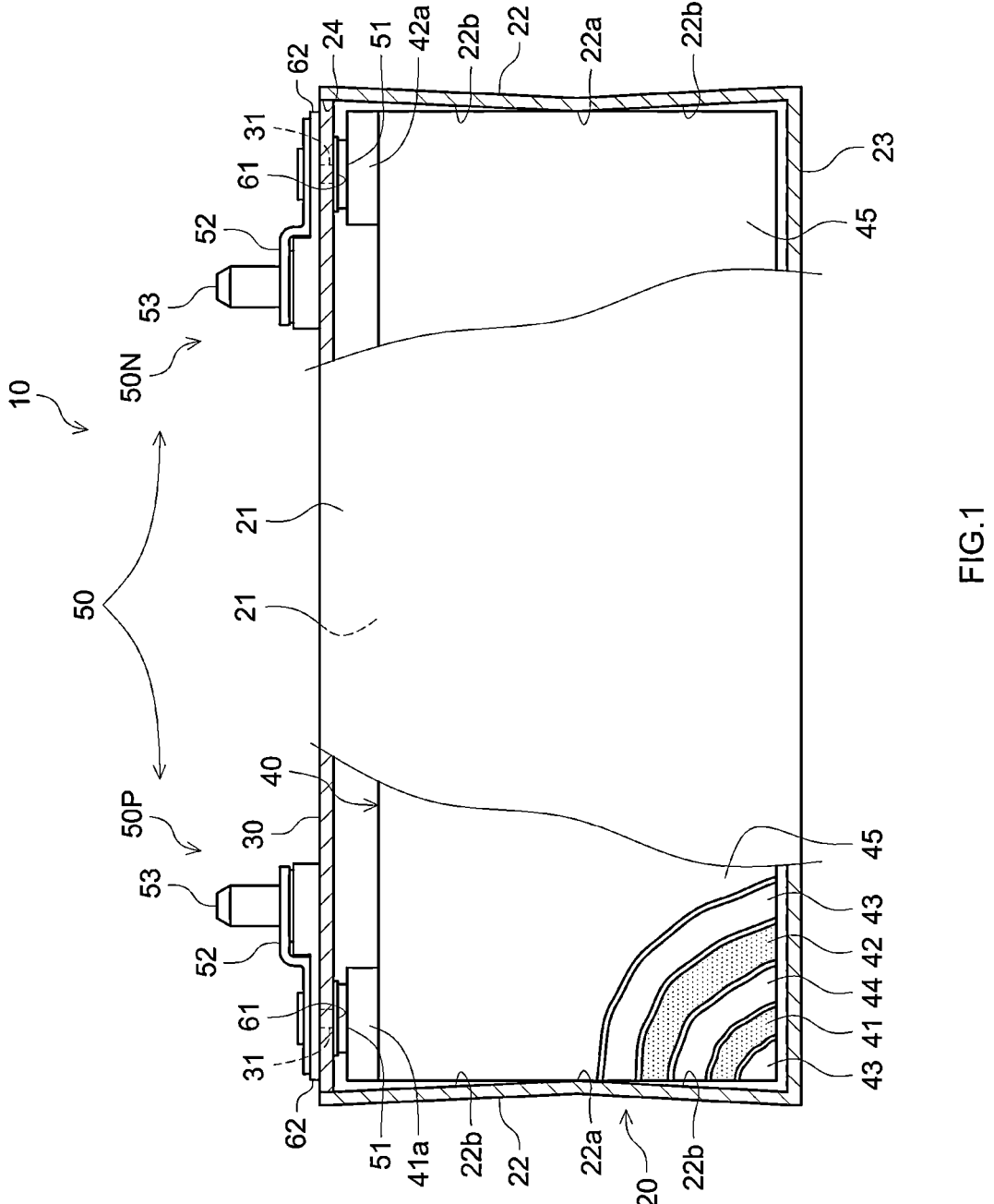
FIG. 1 is a partial cross-sectional view of a square type battery.

FIG. 1 is a partial cross-sectional view of a square type battery 10. FIG. 1 is a view of the square type battery viewed to one side surface (one side surface among one pair of broad width surfaces 21 described later) of a case main body 20 formed in a substantially rectangular parallelopiped, and shows the square type battery in a state where a part of an inside of the case main body 20 is exposed. As shown in FIG. 1, the square type battery 10 includes the case main body 20, a cover 30, an electrode body 40, an electrode terminal 50, a gasket 61, and an insulator 62.

Figure 2:
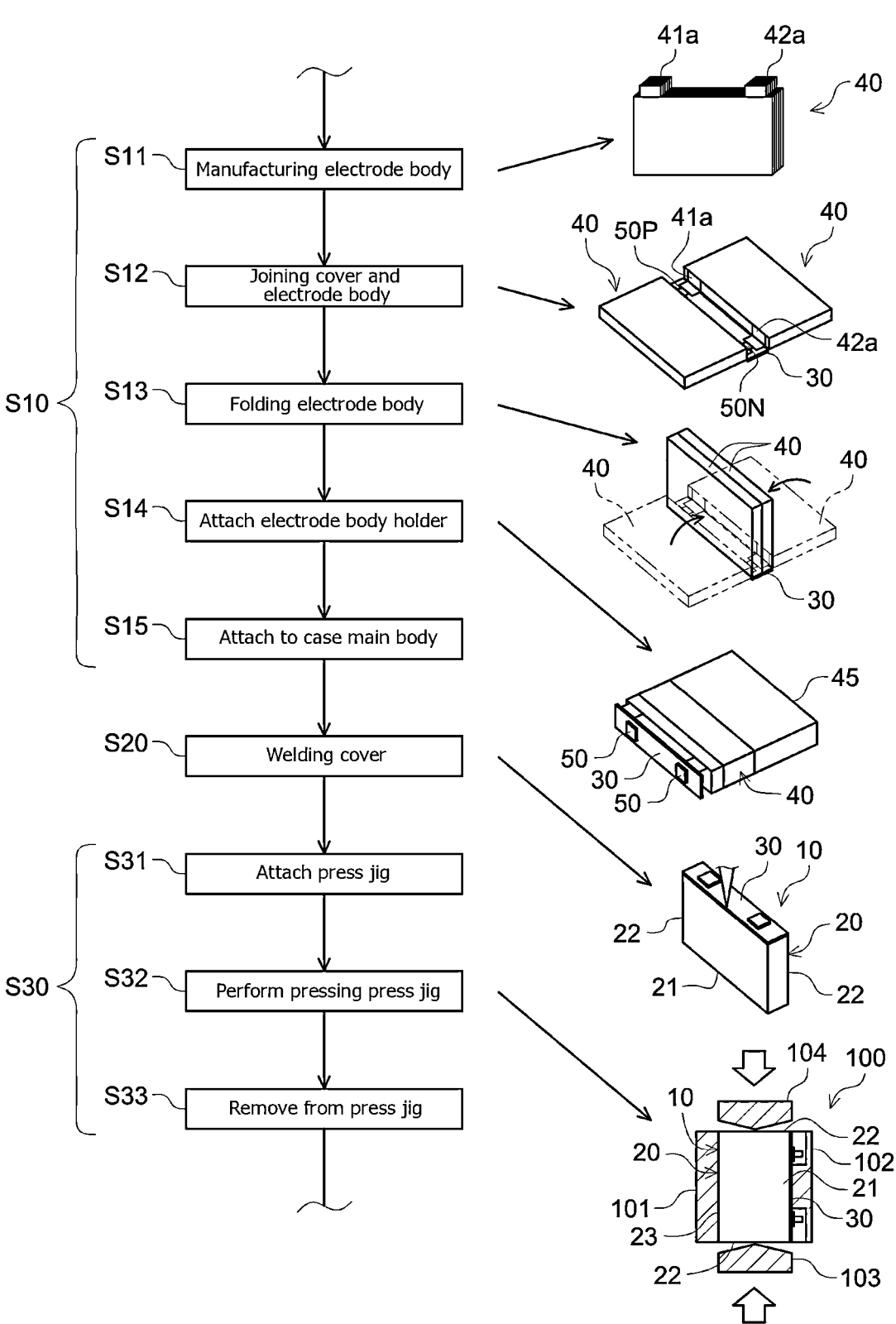
FIG. 2 is a schematic view that shows a part of a manufacturing step of the square type battery.

The case main body 20 accommodates the electrode body 40 and an electrolyte. The case main body 20 is a flat square type container formed in a substantially rectangular parallelopiped. Here, the wording "substantially rectangular parallelopiped" semantically contains not only a rectangular parallelopiped, but also a shape allowed to be a substantially rectangular parallelopiped, for example, whose corners are chamfered or rounded. The case main body 20 includes a pair of opposed side surfaces 21, another pair of opposed side surfaces 22, a bottom surface 23, and an opening 24 that is opened at a position opposed to the bottom surface 23. The opening 24 is one side surface of the case main body 20 to which the cover 30 is attached. Below, among the two pairs of side surfaces 21, 22, one pair of side surfaces having broad widths are referred to as one pair of broad width surfaces 21. Among the two pairs of side surfaces 21, 22, one pair of side surfaces having narrow widths are referred to as one pair of narrow width surfaces 22. For example, as shown in FIG. 2, a width (length in a depth direction of this paper surface of FIG. 1) of the narrow width surface 22 is shorter than a width (length in a left and right direction of FIG. 1) of the broad width surface 21. The one pair of broad width surfaces 21 and the one pair of narrow width surfaces 22 are connected to the opening 24 being a side surface to which the cover 30 is attached. The case main body 20 is formed of, for example, aluminum or aluminum alloy.

The cover 30 is attached to the opening 24 of the case main body 20 so as to close the opening 24. The cover 30 is formed in a plate shape. The cover 30 is formed in a substantially rectangle and provided with the electrode terminal 50. Here, the wording "substantially rectangle" semantically contains not only a rectangle, but also a shape allowed to be a substantially rectangle, for example, in which a hole, a recess, a projection, or the like is formed. The one pair of broad width surfaces 21 and the one pair of narrow width surfaces 22 of the case main body 20 are connected to a peripheral edge part of the cover 30. The cover 30 is also, for example, formed of aluminum or aluminum alloy. Near each of both end parts along a longitudinal direction of the cover 30, a penetration hole 31 is provided. Into each of two penetration holes 31, the electrode terminal 50 is inserted. Among the two electrode terminals 50, one is a positive electrode terminal 50P and the other one is a negative electrode terminal 50N.

The electrode body 40 is accommodated inside the case main body 20. The electrode body 40 includes a positive electrode sheet 41, a negative electrode sheet 42, a first separator sheet 43, and a second separator sheet 44. The first separator sheet 43, the positive electrode sheet 41, the second separator sheet 44, and the negative electrode sheet 42 are overlaid in this order at plural times so as to form a laminate electrode body. However, the first separator sheet 43, the positive electrode sheet 41, the second separator sheet 44, and the negative electrode sheet 42 might be overlaid and then wound to form a wound electrode body. The electrode body 40 here is accommodated inside the case main body 20, while being in a state where an electrode body holder 45 being an insulation body is attached. The electrode body holder 45 is, for example, configured with a film being an insulation body and covers the first separator sheet 43, the positive electrode sheet 41, the second separator sheet 44, and the negative electrode sheet 42 so as to inhibit the positive electrode sheet 41 or the negative electrode sheet 42 from coming into contact with the case main body 20. However, the electrode body holder 45 is not restricted to the film being the insulation body. The electrode body holder 45 might be, for example, an elastically deformable member formed in a box shape, or the like.

The first separator sheet 43 and the second separator sheet 44 are configured to be larger than the positive electrode sheet 41 and the negative electrode sheet 42, and protrude outwardly more than the positive electrode sheet 41 and the negative electrode sheet 42. Thus, the contact of the positive electrode sheet 41 and the negative electrode sheet 42 are inhibited. The positive electrode sheet 41 and the negative electrode sheet 42 respectively include a tab 41a and a tab 42a connected to the positive electrode terminal 50P and the negative electrode terminal 50N.

In the present embodiment, the square type battery 10 is a secondary battery in which a positive electrode active material layer is formed on the positive electrode sheet 41 and a negative electrode active material layer is formed on the negative electrode sheet 42. The kind of the square type battery 10 is not particularly restricted. The square type battery 10 is, for example, a lithium ion secondary battery. The first separator sheet 43, the positive electrode sheet 41, the second separator sheet 44, and the negative electrode sheet 42 are laminated in an aligned direction (depth direction of this paper surface in FIG. 1) of the one pair of broad width surfaces 21 of the case main body 20.

The electrode terminal 50 is connected to the electrode body 40. For more details, the positive electrode terminal 50P is connected to the tab 41a of the positive electrode sheet 41. The negative electrode terminal 50N is connected to the tab 42a of the negative electrode sheet 42. The electrode terminal 50 includes an electrical collector terminal 51, an outside terminal 52, and a bolt terminal 53. The electrical collector terminal 51 is inserted into an inside of the case main body 20 through the penetration hole 31 of the cover 30, and is connected to the tab 41a or the tab 42a. The outside terminal 52 is provided on an upper surface of the cover 30 to be along the upper surface, and is connected to the electrical collector terminal 51. The bolt terminal 53 is connected to the outside terminal 52. A gasket 61 formed with an insulation body was sandwiched between the cover 30 and the electrical collector terminal 51. The gasket 61 establishes an electrical insulation between the cover 30 and the electrical collector terminal 51 and seals the penetration hole 31. An insulator 62 formed with an insulation body is sandwiched between the cover 30 and the outside terminal 52. The insulator 62 electrically insulates a portion between the cover 30 and the outside terminal 52.

At least one side surface among the two pairs of side surfaces 21, 22 of the case main body 20 is pinched to the inward of the case main body 20 to make the at least one side surface and a side surface opposed to the at least one side surface abut the electrode body 40. The inward of the case main body 20 is in a direction to the electrode body 40 viewed from the side surface 21 or 22 of the case main body 20, and, for example, that is a left side for a case of the narrow width surface 22 at a right side of FIG. 1. In the present embodiment, as shown in FIG. 1, pinches abutting the electrode body 40 are formed on one pair of narrow width surfaces 22. In the present embodiment, no pinch is formed on one pair of broad width surfaces 21.

However, the pinches might be formed on the one pair of broad width surfaces 21, but not on the one pair of narrow width surfaces 22. Or, the pinches might be further formed on the one pair of broad width surfaces 21, not only on the one pair of narrow width surfaces 22. Furthermore, a pinch might be formed only on one surface among the one pair of narrow width surfaces 22, but not on both of the one pair. Even in a case where the pinch is formed only on one among the one pair of narrow width surfaces 22, both of the pinched narrow width surface 22 and a narrow width surface 22 opposed to the pinched narrow width surface abut the electrode body 40. Similarly, the pinch might be formed only on one among the one pair of broad width surfaces 21. Incidentally, the phrase that the side surface 21 or 22 of the case main body 20 is "abutting" the electrode body 40 means to hold the electrode body 40 by the case main body 20 so as to make the electrode body 40 hardly move. Making the side surface 21 or 22 of the case main body 20 abut the electrode body 40 semantically contains not only making the side surface 21 or 22 directly touch the electrode body 40, but also making the side surface 21 or 22 hold the electrode body 40 through a member that can transmit holding force, for example, electrode body holder 45.

In the present embodiment, each narrow width surface 22 includes an abutting part 22a that abuts the electrode body 40, and separation parts 22b that are separated and spaced away from the electrode body 40. The separation parts 22b are positioned at both sides of the abutting part 22a. Here, one of the separation parts 22b is positioned at a side (downward in FIG. 1) of the bottom surface 23 of the case main body 20 more than the abutting part 22a, and another one of the separation parts 22b is positioned at a side (upward in FIG. 1) of the cover 30 more than the abutting part 22a. The abutting part 22a is formed at a central part in a longitudinal direction (vertical direction in FIG. 1) of the narrow width surface 22. When viewed toward the broad width surface 21, the abutting part 22a is recessed in an isosceles triangle shape toward an inward side of the case main body 20. As the illustration is omitted, the abutting part 22a is formed over the total width in a width direction (depth direction in FIG. 1) of the narrow width surface 22. The abutting part 22a holds the electrode body 40 to make the electrode body 40 hardly move in the case main body 20. However, the abutting part 22a might be formed only at a part in the width direction (depth direction in FIG. 1) of the narrow width surface 22.

Among the broad width surfaces 21, at least one is separated and spaced away from the electrode body 40. In other words, a width (distance of both among the one pair of broad width surfaces 21) of the narrow width surface 22 is larger than a thickness of the electrode body 40, the electrode body 40 might come into contact with any of the broad width surfaces 21 because of a manufacture reason, but there is no case where electrode body comes into contact with both of the broad width surfaces 21. Therefore, regarding an aligned direction of the broad width surfaces 21, an enough space for expansion and contraction of the electrode body 40 caused by charge and discharge is generated.

[Manufacturing Method of Square Type Battery]

FIG. 2 is a schematic view that shows a part of a manufacturing step of the square type battery 10. As shown in FIG. 2, the manufacturing step of the square type battery 10 includes a step S10 for accommodating the electrode body 40 inside the case main body 20 formed in the substantially rectangular parallelopiped, a step S20 for welding the cover 30 on the case main body 20, and a step S30 for deforming one pair of narrow width surfaces 22 so as to respectively form the abutting parts 22a. However, the steps shown in FIG. 2 are merely suitable examples. For example, as described above, the side surface of the case main body 20 on which the abutting part is formed is not restricted. At the step for forming the abutting part, at least one side surface of the case main body 20 might be pressed and then the pressed side surface might be deformed to make the pressed side surface and a side surface opposed to the pressed side surface abut the electrode body 40. The method disclosed in this embodiment does not restrict the manufacturing method of the square type battery 10.

As shown in FIG. 2, the step S10 for accommodating the electrode body 40 inside the case main body 20 includes a step S11 for manufacturing the electrode body 40, a step S12 for joining two electrode bodies 40 to an assembly of the cover 30 and the electrode terminal 50, a step S13 for folding the two electrode bodies 40, a step S14 for making the electrode body holder 45 cover an assembly of the cover 30, the electrode body 40, and the electrode terminal 50, and a step S15 for attaching an assembly of the cover 30, the electrode body 40, the electrode terminal 50, and the electrode body holder 45 to the case main body 20.

For details of the step S11, explanation is omitted. At the step S12, as shown in FIG. 2, two electrode bodies 40 are arranged at both sides of the cover 30, and in this state, the tab 41a of the positive electrode sheet 41 is welded to the electrical collector terminal 51 of the positive electrode terminal 50P (see FIG. 1) and the tab 42a of the negative electrode sheet 42 is welded to the electrical collector terminal 51 of the negative electrode terminal 50N. At the step S13, the tab 41a and the tab 42a are bent, and two electrode bodies 40 are folded to make the broad width surfaces come into contact with each other. At the step S14, the assembly of the cover 30, the electrode body 40, and the electrode terminal 50 after the electrode body 40 is folded is covered by the electrode body holder 45. By doing this, a portion accommodated in the case main body 20 (here, including the positive electrode sheet 41, the negative electrode sheet 42, the first separator sheet 43, and the second separator sheet 44) of the assembly is covered by the electrode body holder 45. At the step S15, the assembly having been covered by the electrode body holder 45 is attached to the case main body 20. By doing this, the cover 30 is attached to the opening 24 of the case main body 20. And the electrode body 40 is accommodated inside the case main body 20.

At the step S20, the cover 30 is welded to the case main body 20. Incidentally, the step S20 might be performed after the step S30 for forming the abutting part 22a on the case main body 20.

At the step S30, the one pair of narrow width surfaces 22 are deformed so as to form abutting parts 22a respectively on the one pair of narrow width surfaces 22. The step S30 includes a step S31 for attaching the square type battery 10 (which is not yet a finished product, but is also referred to as the square type battery 10, simply, hereinafter for convenient sake) being after the step S20 to a press jig 100 that is for forming the abutting part 22a, a step S32 for pressing the press jig 100 with a press (not shown) so as to form the abutting part 22a, and a step S33 for removing the square type battery 10 from the press jig 100.

Although a detailed illustration for the step S31 is omitted, the press jig 100 to which the square type battery 10 has been attached becomes in a state as shown in FIG. 2. As shown in FIG. 2, the press jig 100 includes a bottom side fixing die 101, a cover side fixing die 102, a first press die 103, and a second press die 104. The bottom side fixing die 101 abuts the bottom surface 23 of the case main body 20. The cover side fixing die 102 abuts the cover 30. The bottom side fixing die 101 and the cover side fixing die 102 hold the square type battery 10. The first press die 103 abuts one of the narrow width surfaces 22. The first press die 103 includes a projection part whose shape corresponds to a shape of the abutting part 22a. The second press die 104 abuts the other one of the narrow width surfaces 22. The second press die 104 also includes a projection part whose shape corresponds to the shape of the abutting part 22a.

As shown by an arrow in FIG. 2, the press (not shown) presses the first press die 103 and the second press die 104 so as to make the first press die 103 and the second press die 104 move closer to each other. The press presses the first press die 103 and the second press die 104 so as to, for example, crush edges of the first separator sheet 43 and the second separator sheet 44 by a predetermined amount based on a drawing dimension. The above-described predetermined amount is, for example, preferably about 0.5 mm for one side in the press direction. However, the amount for deforming the case main body 20 by the press jig 100 is not restricted to the above-described amount.

Incidentally, in a case where the abutting part 22a is formed on only one of the narrow width surfaces 22, the press die 103 or 104 at a side where the abutting part 22a is not formed might be formed in a flat shape. In addition, the abutting part 22a might be formed over all portions or approximately all portions of the narrow width surface 22, and in this case, the abutting part 22a might be formed, for example, by a squeezing process.

Effect of Embodiment

As described above, the square type battery 10 in accordance with the present embodiment includes the cover 30 that is formed in the substantially rectangle and provided with the electrode terminal 50, the case main body 20 that is formed in the substantially rectangular parallelopiped and is provided with the two pairs of opposed side surfaces 21, 22 connected to the peripheral edge part of the cover 30, and the electrode body 40 that is accommodated inside the case main body 20 and is connected to the electrode terminal 50. At least one side surface (call it a first side surface, here) among the two pairs of opposed side surfaces 21, 22 is pinched to the inward of the case main body 20. The first side surface and a side surface opposed to the first side surface (call it a second side surface, here) abut the electrode body 40. According to the square type battery 10 as described above, at least one pair of side surfaces (that is, the first and the second side surface) of the case main body 20 abuts the electrode body 40 so as to hold the electrode body 40. Thus, it is possible to suppress the electrode body 40 from moving in the case main body 20. Additionally, in the present embodiment, by previously making the case main body 20 whose inner dimension is surely larger than the electrode body 40 and then by forming the pinch after the electrode body 40 is accommodated in the case main body 20, it is possible to easily accommodate the electrode body 40 in the case main body 20.

In the present embodiment, the two pairs of side surfaces 21, 22 of the case main body 20 include one pair of broad width surfaces 21 and one pair of narrow width surfaces 22. The first side surface is one among the one pair of narrow width side surfaces. The second side surface is another among the one pair of narrow width side surfaces. At least one narrow width surface 22 among the one pair of narrow width surfaces 22 is pinched to the inward of the case main body 20, and the pinched narrow width surface 22 and the narrow width surface 22 opposed to the pinched e narrow width surface 22 abut the electrode body 40. On the other hand, at least one broad width surface 21 among the one pair of broad width surfaces 21 is separated and spaced away from the electrode body 40. According to the square type battery 10, it is possible to suppress the movement of the electrode body 40 by the one pair of narrow width surfaces 22 and to generate enough space for making the electrode body 40 expand in the aligned direction of the one pair of broad width surfaces 21. The electrode body 40 expands mainly in an aligned direction of the broad width surfaces 21 which is a laminate direction of the first separator sheet 43, the positive electrode sheet 41, the second separator sheet 44, and the negative electrode sheet 42. Thus, it is preferable that the square type battery 10 includes a gap in which the electrode body 40 can be expanded, regarding the aligned direction of the one pair of broad width surfaces 21. If this kind of gap is not present, the first separator sheet 43 and the second separator sheet 44 might be thinner gradually and the characteristic of the battery might be deteriorated.

In the present embodiment, the pinched side surface of the case main body 20 (here, one pair of narrow width surfaces 22) includes the abutting part 22a that abuts the electrode body 40, and the separation parts 22b that are positioned at both sides of the abutting part 22a and that are separated and spaced away from the electrode body 40. When the abutting part 22a is formed by deforming the side surface of the case main body 20, deforming the side surface to make a part of the side surface abut the electrode body 40 is easier than deforming the side surface to make all portions of the side surface abut the electrode body 40. Thus, the square type battery 10 can be manufactured more easily. In addition, the electrolyte enters into a gap between the separation part 22b and the electrode body 40, and thus the performance as for the battery could be enhanced. The gap between the separation part 22b and the electrode body 40 can function as an escape space for gas when reaction of the electrode body 40 and the electrolyte generates the gas.

The manufacturing method of the square type battery 10 in accordance with the present embodiment includes the step S10 for accommodating the electrode body 40 inside the case main body 20 formed in the substantially rectangular parallelopiped, and the step S30 for pressing at least one side surface of the case main body 20 and for deforming the pressed side surface so as to make the pressed side surface and the side surface opposed to the pressed side surface abut the electrode body 40. According to the manufacturing method of the square type battery 10 as described above, it is possible to manufacture the square type battery 10 in which the electrode body 40 hardly moves in the case main body 20.

In the present embodiment, the side surface of the case main body 20 includes a side surface (opening 24) to which the cover 30 provided with the electrode terminal 50 is attached, and the one pair of broad width surfaces 21 and the one pair of narrow width surfaces 22, each connected to the side surface (opening 24) to which the cover 30 is attached. At the step S30 for deforming the side surface of the case main body 20, at least one among the one pair of narrow width surfaces 22 is deformed. According to the manufacturing method of the square type battery 10 as described above, it is possible to manufacture the square type battery 10 that can suppress the movement of the electrode body 40 by the one pair of narrow width surfaces 22 and further that, regarding the aligned direction of the one pair of broad width surfaces 21, includes the gap for allowing the expansion of the electrode body 40.

Modified Embodiment

Figure 3:
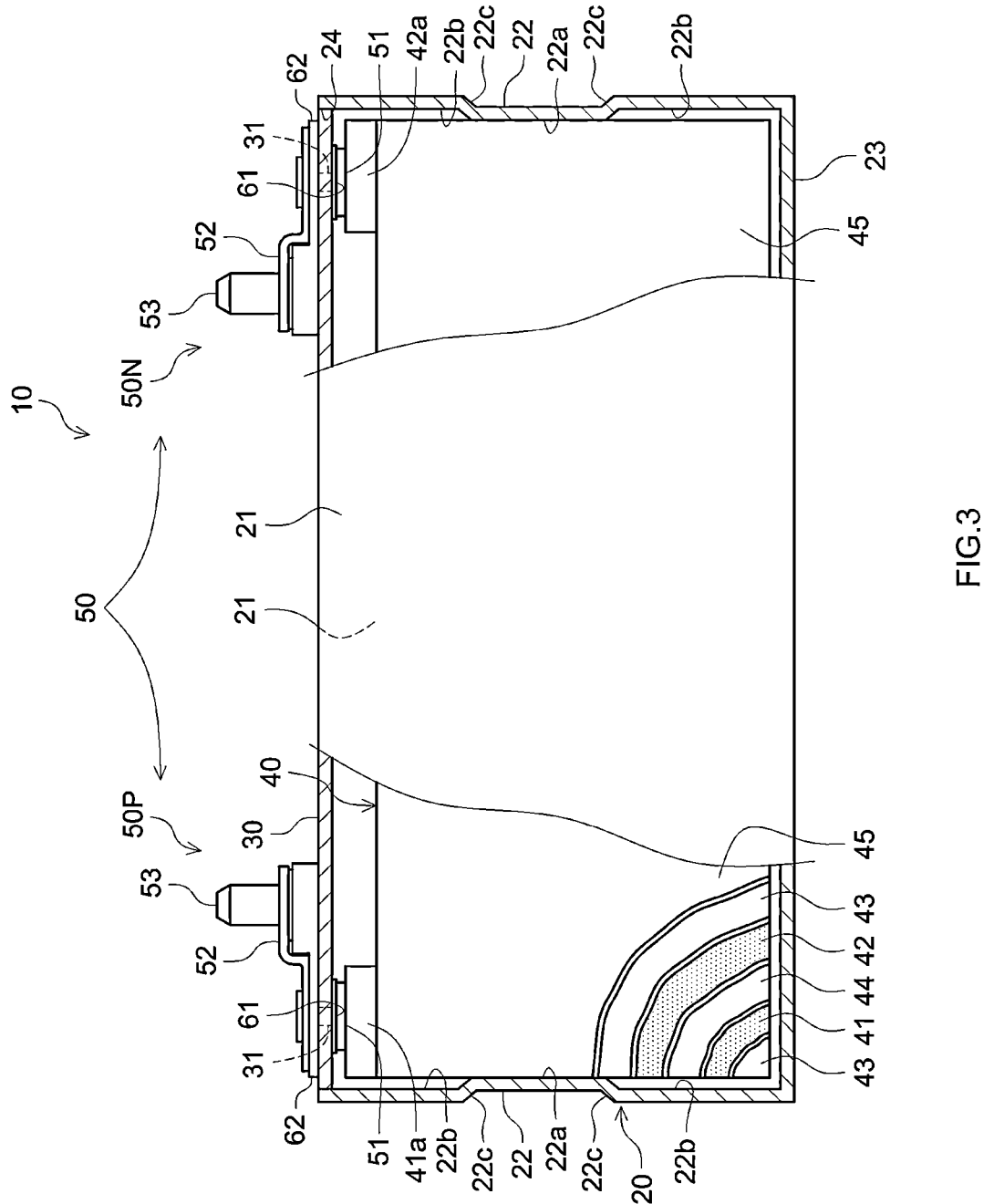
FIG. 3 is a partial cross-sectional view of the square type battery in accordance with a first modified embodiment.

The square type battery 10 described above can be implemented in another aspect. FIG. 3 is a partial cross-sectional view of the square type battery 10 in accordance with a first modified embodiment. As shown in FIG. 3, in this modified embodiment, only a part of the narrow width surface 22 is deformed (in the square type battery 10 of FIG. 1, although only the abutting part 22a abuts the electrode body 40, all portions or approximately all portions of the narrow width surface 22 are deformed to be dented). As described above, at the step for deforming the side surface of the case main body 20, the pressed side surface might be pressed partially. According to the manufacturing method as described above, when the abutting part 22*a* is formed, the side surface of the case main body 20, other than the abutting part 22*a* and its support portion 22*c*, is not deformed. Therefore, furthermore easily (for example, by using a press whose press pressure is small), it is possible to deform the side surface of the case main body 20. Incidentally, the shape of the abutting part 22*a* is not restricted to the trapezoidal shape as shown in FIG. 3.

Figure 4:
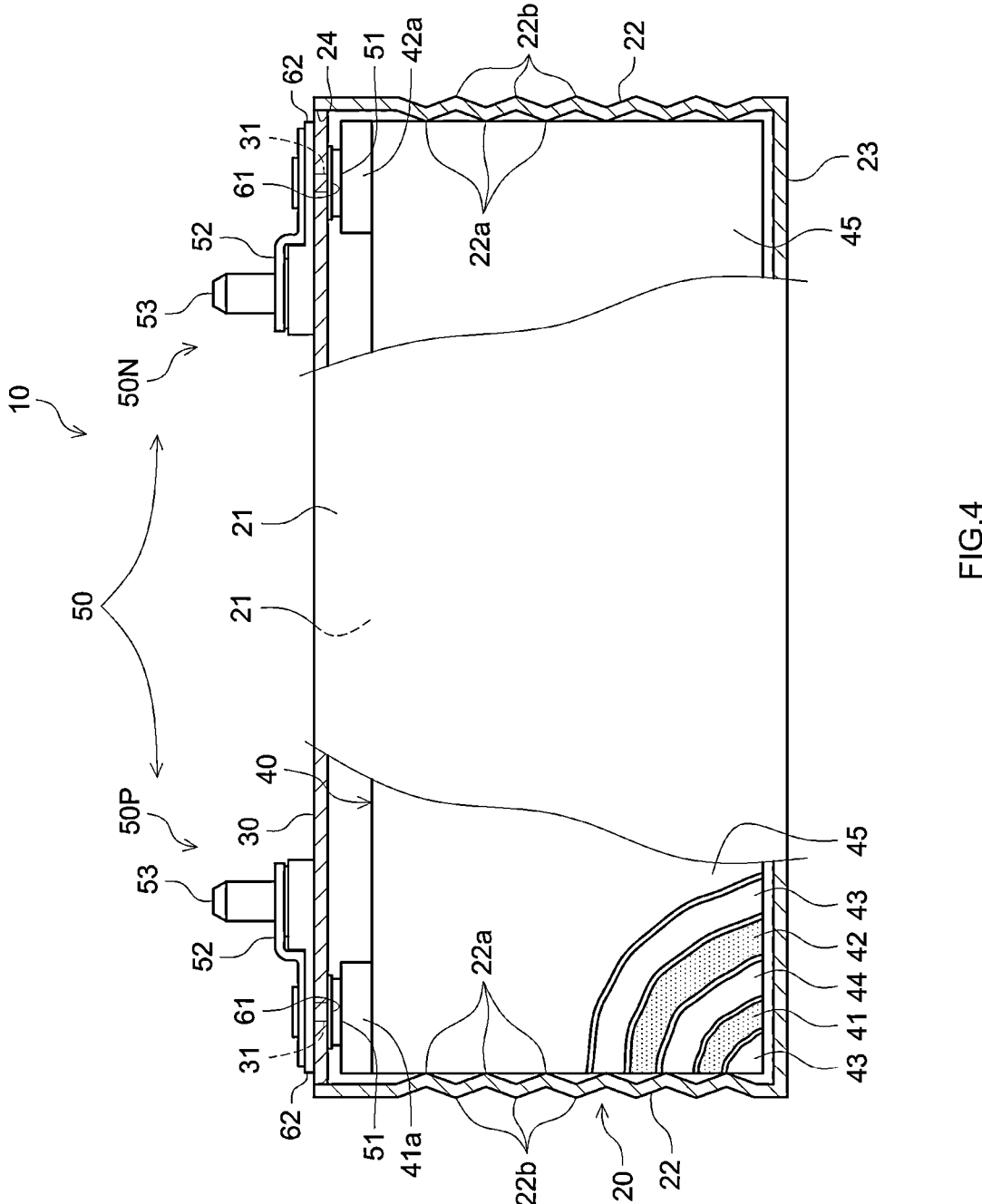
FIG. 4 is a partial cross-sectional view of the square type battery in accordance with a second modified embodiment.

FIG. 4 is a partial cross-sectional view of the square type battery 10 in accordance with a second modified embodiment. As shown in FIG. 4, in this modified embodiment, a plurality of abutting parts 22*a* and a plurality of separation parts 22*b* are formed on the side surface of the case main body 20. The plurality of abutting parts 22*a* and the plurality of separations part 22*b* are alternately continued to make the side surface of the case main body 20 be wavy. According to the square type battery 10 as described above, the electrode body 40 can be held by the plurality of abutting parts 22*a* for one side surface. Thus, holding the electrode body 40 becomes more stable. The number and positions of the abutting parts 22*a* are not particularly restricted.

It is possible to suitably combine the firstly described embodiment and the modified embodiments. For example, respectively on one and the other one among the one pair of narrow width surfaces 22 (or broad width surfaces 21), different shapes or different number of pinches might be formed.

Above, the herein proposed square type battery and the manufacturing method of it were variously explained. However, unless specifically mentioned, the embodiments of the square type battery mentioned here or the like do not restrict the present invention.

What is claimed is:

1. A square type battery, comprising:
a cover that is formed in a substantially rectangle and provided with a terminal;
a case main body that is formed in a substantially rectangular parallelopiped and includes two pairs of opposed side surfaces connected to a peripheral edge part of the cover; and
an electrode body that is accommodated inside the case main body and connected to the terminal, wherein the electrode body comprises separator sheets and electrode sheets stacked in a first direction,
at least a first side surface among the two pairs of opposed side surfaces is pinched to define a concavity toward an inward of the case main body, wherein the concavity extends in a second direction perpendicular to the first direction,
the first side surface and a second side surface opposed to the first side surface abut the electrode body at the concavity,
the two pairs of opposed side surfaces include one pair of broad width side surfaces and one pair of narrow width side surfaces, wherein each of the pair of broad width side surfaces extends perpendicular to each of the pair of narrow width side surfaces, the first side surface is one among the one pair of narrow width side surfaces,
the second side surface is another among the one pair of narrow width side surfaces, and
at least one among the one pair of broad width side surfaces is separated and spaced away from the electrode body.

2. The square type battery according to claim 1, wherein the first side surface includes:
an abutting part that abuts the electrode body; and
a separation parts that are positioned at both sides of the abutting part and separated and spaced away from the electrode body.

3. A manufacturing method of a square type battery, comprising:
accommodating an electrode body inside a case main body formed in a substantially rectangular parallelopiped, wherein the electrode body comprises separator sheets and electrode sheets stacked in a first direction; and
pressing, in a second direction perpendicular to the first direction, at least one side surface of the case main body and deforming the pressed side surface to make the pressed side surface and a side surface opposed to the pressed side surface abut the electrode body, wherein
side surfaces of the case main body include:
a side surface to which a cover provided with a terminal is attached; and
one pair of broad width side surfaces and one pair of narrow width side surfaces each connected to the side surface to which the cover is attached, each of the pair of broad width side surfaces extends perpendicular to each of the pair of narrow width side surfaces and wherein
at the deforming the side surface, at least one among the one pair of narrow width side surfaces is deformed.

4. The manufacturing method of the square type battery according to claim 3, wherein,
at the deforming the side surface, the pressed side surface is pressed partially.

5. The manufacturing method of the square type battery according to claim 3, wherein pressing the at least one side surface of the case main body comprises:
defining a concavity, wherein the pressed side surface abuts the electrode body at the concavity.

6. The manufacturing method of the square type battery according to claim 3, wherein the pressing is free of pressing in the first direction, and a gap is maintained between each of the pair of broad width side surfaces and the electrode body.

7. The manufacturing method of the square type battery according to claim 3, wherein the pressing defines a plurality of concavities extending in the second direction.

8. The square type battery according to claim 1, wherein the concavity is one of a plurality of concavities each extending in the second direction.

* * * * *